United States Patent
Yutani et al.

(10) Patent No.: US 6,619,130 B1
(45) Date of Patent: Sep. 16, 2003

(54) PRESSURE SENSOR

(75) Inventors: Naoki Yutani, Tokyo (JP); Hiroshi Ohji, Tokyo (JP); Kazuhiko Tsutsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/148,809

(22) PCT Filed: Jul. 31, 2000

(86) PCT No.: PCT/JP00/05124
§ 371 (c)(1),
(2), (4) Date: Jun. 5, 2002

(87) PCT Pub. No.: WO02/10703
PCT Pub. Date: Feb. 7, 2002

(51) Int. Cl.[7] .......................... G01L 13/02; G01L 15/00
(52) U.S. Cl. ....................................................... 73/716
(58) Field of Search .................... 73/715, 716, 717, 73/718, 719, 720, 721, 722, 723, 724, 725, 726, 727

(56) References Cited

U.S. PATENT DOCUMENTS 4,320,664 A    3/1982    Rehn et al.
4,682,503 A    7/1987    Higashi et al.

FOREIGN PATENT DOCUMENTS

| EP | 435611 | 7/1991 |
|----|--------|--------|
| EP | 1059517 | 12/2000 |
| JP | 58-72059 | 4/1983 |
| JP | 60-056233 | 4/1985 |
| JP | 61-137242 | 8/1986 |
| JP | 5-10840 | 1/1993 |
| JP | 6-241933 | 9/1994 |
| JP | 8-184514 | 7/1996 |
| WO | WO00/39551 | 7/2000 |

*Primary Examiner*—William Oen
(74) *Attorney, Agent, or Firm*—Leydig, Voit & Mayer, Ltd.

(57) ABSTRACT

A pressure sensor includes a first diaphragm having a first surface receiving pressure, a first thermal detection section located opposite a central section of the first diaphragm, and a second thermal detection section having little displacement by pressure, and located opposite the first diaphragm The pressure sensor amplifies and outputs a difference between the first thermal detection section for pressure measurement and the second thermal detection section for reference output. Since the diaphragm to which the second thermal detection section is opposed is equal in thickness to the diaphragm to which the first thermal detection section is opposed, pressure can be accurately measured relative to a sudden change in atmospheric temperature.

3 Claims, 6 Drawing Sheets

PRESSURE SENSOR

TECHNICAL FIELD

This invention relates to a pressure sensor which measures pressure. More particularly, this invention relates to a pressure sensor which measures calories deprived of a heating element included in a thermal pressure detector or a section heated by the heating element and having a diaphragm which is arranged to be opposite to and away from the heating element or the heated section by a fixed distance, by using the thermal pressure detector.

BACKGROUND ART

A pressure sensor which measures the flexible quantity of a diaphragm using an almost univocal functional relationship held between the pressure of a measurement target fluid and the flexible quantity of the diaphragm on a cylinder which diaphragm receives pressure from the measurement target fluid and using a distortion gauge which is formed on the diaphragm by a film formation technique, a photo-engraving technique or the like, and which sensor thereby obtains the pressure of the fluid proportional to the flexible quantity of the diaphragm, is widely utilized for the detection of the quantity of the intake air of an internal combustion engine, that of the oil pressure of a vehicle brake or the like.

FIG. 6 is a cross-sectional view of a conventional pressure sensor which is disclosed by, for example, Japanese Utility Model Application Laid-Open No. S61-137242 (microfilm of Japanese Utility Model Application No. S60-19572).

In FIG. 6, a reference symbol 101 denotes a metallic cylinder, 102 denotes a semiconductor monocrystalline plate which is provided with a distortion gauge 103 and the semiconductor monocrystalline plate consists of, for example, a silicon substrate. For the pressure sensor in which the semiconductor monocrystalline plate 102 is bonded to the metallic cylinder 101 shown in FIG. 6, the metallic cylinder 101 and the semiconductor monocrystalline plate 102 differ in material and a distortion, therefore, tends to occur to the semiconductor monocrystalline plate 102 which constitutes a diaphragm due to the difference in the coefficient of linear expansion between the cylinder 101 and the plate 102 at a time when temperature change. This causes a measurement error. In addition, since the pressure of a measurement target fluid is directly applied to the semiconductor monocrystalline plate 102, it is necessary to secure sufficiently high bonding strength between the metallic cylinder 101 and the semiconductor monocrystalline plate 102.

In FIG. 7, a reference symbol 104 denotes a metallic cylinder which consists of a cut-off pipe such as a stainless pipe. A metallic thin film 105 which is welded to the cylinder 104 is formed out of a thin plate of a rolled material and it has a uniform film thickness and a flat surface because of the rolled material. The material of the metallic thin film 105 is the same as that of the cylinder 104. In addition, a silicon oxide thin film 106 which functions as an insulating film, is formed on the upper surface of the metallic thin film 105. A plasma CVD method is used to form the silicon oxide thin film 106. A silicon thin film which constitutes a distortion gauge 107 is then formed on the silicon oxide thin film by the plasma CVD method. This silicon thin film is etched to partially leave the silicon thin film and remove the other sections as shown in FIG. 7, and the distortion gauge 107 is formed out of the silicon thin film which is thus left. Furthermore, metal such as gold is deposited on the distortion gauge 107 to thereby form an electrode. A lead wire is bonded to this electrode by ultrasonic bonding. The electrode and the lead wire are appropriately connected to each other, whereby a circuit can be formed.

Each of the conventional pressure sensors shown in FIGS. 6 and 7 uses the distortion gauge. The diaphragm is distorted by the pressure of the measurement target fluid applied to the diaphragm and each of these pressure sensors measures the distortion by the distortion gauge provided on the diaphragm. Besides these pressure sensors, a pressure sensor which detects the flexure of a diaphragm as a capacitance change is also used.

FIGS. 8(a), 8(b), and 8(c) are a cross-sectional view, and top views of a conventional pressure sensor of a capacitance detection type disclosed in Japanese Patent Application Laid-Open No. S60-56233.

In FIG. 8, reference symbol 108 denotes a substrate which has an electrode 109 provided on the central section of an upper surface thereof, an electrode 110 for correction concentric to the both and provided on an edge section thereof and a penetrating hole 111 provided in the gap between the electrode 109 and the correction electrode 110. Reference symbol 112 denotes a diaphragm which has an electrode 113 which is provided on a surface thereof and which is opposed to the electrode 109. Reference symbol 114 denotes gap adjustment glass beads which are interposed between the substrate 108 and the diaphragm 112 so as to form a gap 115 between the electrodes 109 and 113. In this pressure sensor, when pressure P is applied to the diaphragm 112, the gap 115 in the central section becomes smaller and static capacitance increases between the electrodes 109 and 113. The pressure sensor is intended to measure the pressure using an almost univocal functional relationship held between this capacitance change and the pressure of a measurement target fluid.

According to the conventional pressure sensor which is constituted as explained above, when the distortion gauge formed on the silicon substrate is used, it is impossible to secure sufficient bonding strength between the cylinder and the silicon substrate on which the distortion gauge is formed. It is, therefore, impossible to directly apply the pressure of the measurement target fluid to the silicon substrate and to measure the pressure of the measurement target fluid. Accordingly, it is required to cause pressure to act on a buffer in a different chamber, using the diaphragm which is deformed by the measurement target fluid, and to measure the pressure of the buffer using the distortion gauge provided on the silicon substrate.

Further, it is not easy to directly manufacture silicon thin film distortion gauges on a metallic diaphragm which directly receives a large pressure. This is because an apparatus for the silicon substrate (for silicon process) cannot be used as a diversion.

Moreover, according to the capacitance detection type pressure sensor, it is necessary to form an insulating layer on the metallic diaphragm and to then form a capacitance detection electrode using the photo-engraving technique or the like. As can be seen, when the metallic diaphragm is used, it is conventionally necessary to subject the metallic diaphragm to film formation processing, photo-engraving processing and the like. However, a film formation apparatus and a photo-engraving apparatus conventionally used for a silicon substrate cannot be used to carry out these processing. Besides, when the silicon substrate is used, the structure of the pressure sensor is complicated, making it disadvantageously impossible to manufacture a highly reliable, inexpensive pressure sensor.

SUMMARY OF THE INVENTION

This invention has been achieved to solve the above-explained conventional disadvantages. It is an object of this invention to provide a simple thermal pressure sensor. The thermal pressure sensor thermally detects the displacement quantity of a diaphragm which receives pressure and measures a change in calories following the deformation of the diaphragm and deprived of the heating element of a detector or a section heated by the heating element which is spaced from the diaphragm by a fixed distance.

According to this invention, it is possible to manufacture measurement target elements on a silicon substrate in block in large quantities using a manufacturing technique and a manufacturing apparatus which are conventionally adapted to the silicon substrate. A metallic diaphragm provided on a cylinder is used as a pressure receiving member. It is an object of this invention to obtain a highly reliable, inexpensive pressure sensor which is not required to process the metallic diaphragm and provide a different chamber in which a buffer is held because an external force does not directly act on the measurement target element during pressure measurement.

According to one aspect of the invention, there is provided a pressure sensor in which it is constituted such that it includes a diaphragm structure having a first surface which receives pressure, and a first thermal detection section having a heating unit and arranged to be opposed to a central section of a second surface of the diaphragm structure, and which pressure sensor thermally detects a displacement quantity of the diaphragm caused by a pressure change by the first thermal detection section, wherein a second thermal detection section having a heating unit is provided, and at least a part of the second thermal detection section is arranged to be opposed to one of the diaphragm or a second diaphragm equal in structure to the diaphragm. This makes it unnecessary to subject a diaphragm surface which receives the pressure to processing such as film formation and photo-engraving. It is, therefore, possible to manufacture principle parts of a thermal pressure detector in block and in large quantities on a silicon substrate at simple manufacturing steps, to improve the accuracy and reliability of the thermal pressure detector, and to obtain an inexpensive pressure sensor. In addition, the pressure sensor thermally measures the pressure in a non-contact manner. Therefore, an external force does not directly act on the thermal pressure detector during measurement. Thus, it is unnecessary to secure sufficient bonding strength to resist the pressure of a measurement target fluid between a cylinder and the thermal pressure detector. It is possible to be of a simple structure and to obtain an inexpensive pressure sensor. Furthermore, the thermal detection section is provided to be opposed to the section of the diaphragm other than the center thereof which section is equal in film thickness to the central section of the second surface of the diaphragm to which the first thermal detection section is opposed to but which has a smaller displacement caused by pressure than that of the central section or to be opposed to the second diaphragm equal in structure to the above diaphragm. The first thermal detection section and the second thermal detection section are connected to constant-current sources, respectively to obtain a pressure signal output and a reference output having a smaller change according to pressure in order to obtain the difference between the signal output and the reference output. It is, therefore, possible to remove a noise component in the same phase or an offset drift component caused by a change in atmospheric temperature, and to thereby obtain an inexpensive, highly reliable pressure sensor.

In addition, the second thermal detection section for reference output is arranged to be opposed to the second diaphragm which is equal in film thickness to the diaphragm, to which the first thermal detection section for pressure signal output is opposed, and which diaphragm does not receive pressure, and the difference between the signal output and the reference output is obtained. It is, therefore, possible to remove a noise component in the same phase or an offset drift component caused by a change in atmospheric temperature, and to thereby obtain an inexpensive, highly reliable pressure sensor.

Moreover, the second diaphragm equal in film thickness to the diaphragm to which the first thermal detection section for pressure signal output is opposed, and adjacent to the peripheral section of the diaphragm, is formed. The second thermal detection section for reference output is opposed to the second diaphragm and the difference between the signal output and the reference output is obtained. It is, therefore, possible to remove a noise component in the same phase or an offset drift component caused by a change in atmospheric temperature, and to thereby obtain an inexpensive, highly reliable pressure sensor.

BEST MODE FOR CARRYING OUT THE INVENTION

Figure 1A:
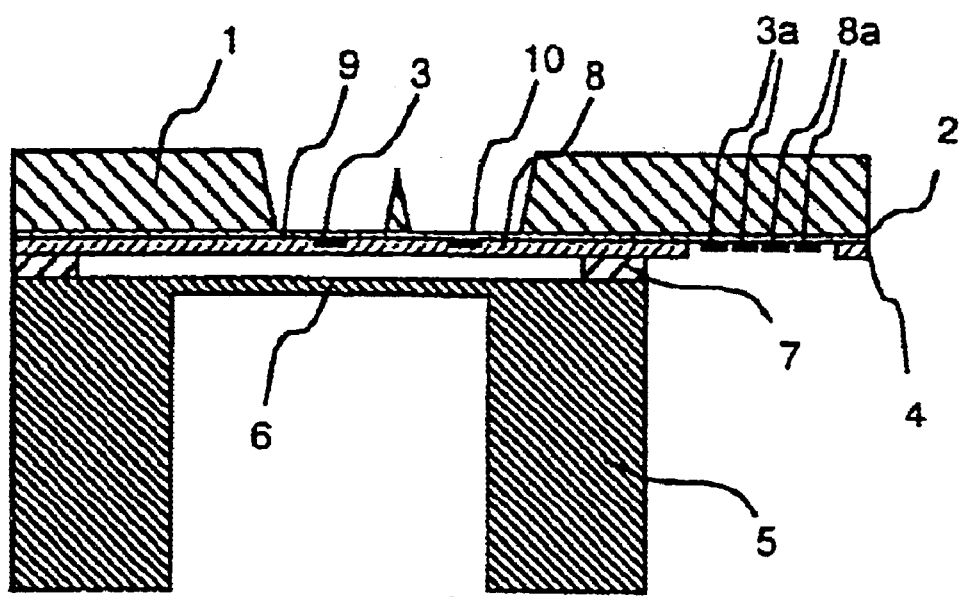
FIGS. 1(a) and 1(b) are cross-sectional and plan views of a pressure sensor according to a first embodiment of the present invention.
Figure 1B:
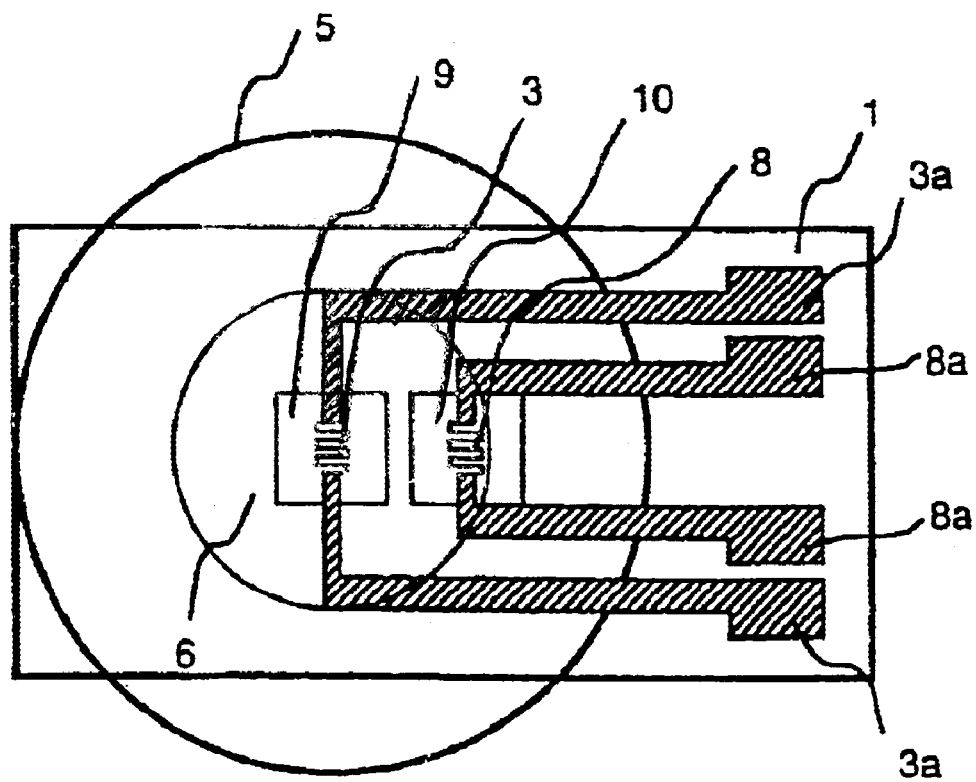
Figure 2:
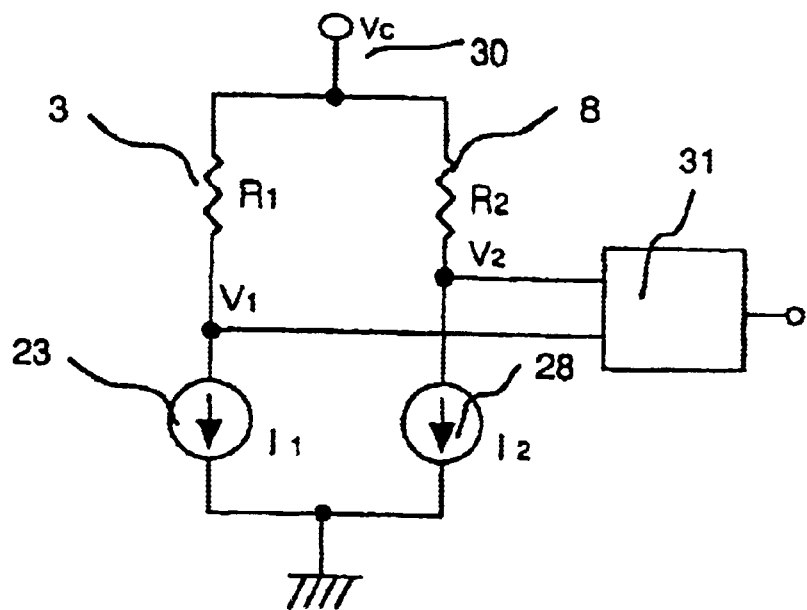
FIG. 2 is a schematic block diagram of a signal read circuit.

The embodiments of this invention will be explained hereinafter with reference to the drawings. First Embodiment:

FIGS. 1(a), 1(b), and 2 are views which explain a pressure sensor according to the first embodiment of the present invention. FIG. 1(a) is a cross-sectional view, FIG. 1(b) is a plan view, and FIG. 2 is a schematic block diagram of a read circuit.

In FIGS. 1(a), 1(b), and 2, reference symbol 1 denotes a flat base material of a thermal sensor which is cut down from, for example, a silicon wafer, 5 denotes a cylinder of, for example, SUS and a diaphragm 6 which receives pressure is formed. Reference symbol 2 denotes an insulating support film which is formed on one surface of the flat base material 1 and which is made of, for example, a silicon nitride film. A thermo-sensitive resistor film 3 is formed thereon. This thermo-sensitive resistor film corresponds to a heat emitting section which is used for heating resistance, temperature measurement resistance and relative resistance, which is made of, for example, platinum. In addition, a second thermo-sensitive resistor film 8 for reference output is formed. The thermo-sensitive resistor film 3 is arranged to be opposite to the center of the diaphragm 6 whereas the second thermo-sensitive resistor film 8 is arranged to be opposite to the peripheral section of the diaphragm 6 which section has a smaller displacement relative to pressure. A protection film 4 is formed to cover the thermo-sensitive resistor films 3 and 8. Further, the silicon base material 1 around the thermo-sensitive resistor films 3 and 8 is removed and diaphragms 9 and 10 consisting of silicon nitride films 2 and 4 are formed so that heat generated in the thermo-sensitive resistor films 3 and 8 does not escape to the silicon base material 1 but flows in the SUS diaphragm 6 and the SUS cylinder 5 to be thereby efficiently utilized. Further, a spacer 7 is provided so that the diaphragm 6 is arranged to be opposite to the measurement sections of the thermo-sensitive resistor films 3 and 8 and away therefrom by a predetermined distance. Reference symbols 3a and 8a denote pad sections (wiring takeoffs) of the thermo-sensitive resistor films 3 and 8, respectively. The first thermo-sensitive resistor 3 for pressure measurement and the second thermo-sensitive resistor 8 for reference output are designed to have the same structure and the same resistance.

A method of manufacturing principal parts of the pressure detector shown in FIG. 1 will next be explained. A silicon nitride film having a thickness of, for example, 1 $\mu$m is formed on a silicon wafer 1 which has a thickness of about 400 $\mu$m and which serves as the flat base material by a method such as a sputtering method, and the thermo-sensitive resistor film 3 which is made of platinum or the like and which has a thickness of, for example, 0.2 $\mu$m is formed thereon by a deposition method, the sputtering method or the like. Annealing is then performed for few hours at about 600° C. for stabilization. This platinum film 3 is patterned by using a photo-engraving method, a wet etching method, a dry etching method or the like. As a result, current paths 3 and 8 having a pattern as shown in, for example, FIG. 1(b) are formed. A silicon nitride film which has a thickness of about 0.8 $\mu$m and which serves as the protection film 4, is formed on the platinum films 3, 8 and the silicon nitride film 2 by the sputtering method or the like. After forming the surface protection film 4, a spacer is formed. When the spacer is to be of an organic insulating film such as polyimide resin, it is formed by, for example, the following manner. The surface protection film 4 is formed first and a polyimide coating agent is then uniformly applied on the silicon substrate by a method such as spin-coating. A photosensitive resist is then applied and the polyimide resin is processed in a desired pattern by the photo-engraving technique. When a photosensitive polyimide coating agent is used, the pattern can be directly formed without using the resist, making the formation simpler. After being pattern processed, it is baked and solidified at about 300° C. to be polyimide resin. In this way, when the polyimide coating agent is used, the spacer can be accurately formed by a simple process. Finally, desired patterning is conducted to the surface of the flat base material 1 opposite to the surface on which the support film 2 is arranged, by the photo-engraving or the like and then is subjected to, for example, alkali etching. By doing so, a part of the flat base material 1 around the thermo-sensitive resistors 3 and 8 is removed, the diaphragms 9 and 10 consisting of the silicon nitride films 2 and 4 are formed and the first and second thermo-sensitive resistors are formed in different diaphragm structures. As can be seen, the pressure detector section of the pressure sensor of the present invention is formed on the silicon substrate using a so-called silicon technology as well as the film formation and photo-engraving technique. The detector section is not directly formed in the diaphragm 6 provided at the cylinder 5 and the pressure detector section and the cylinder 6 are connected to each other through the spacer. The following advantage can be, therefore, obtained. That is, thermal pressure detectors manufactured in block in large quantities on the silicon substrate are high in reliability and easily obtained at low cost. Furthermore, since no external force acts on the thermal pressure detector during the pressure measurement, high bonding strength is not required between the thermal pressure detector and the diaphragm, making it possible to be of a simple pressure sensor structure.

A read circuit and the operation thereof will next be explained with reference to FIGS. 1 and 2. A current is carried to the pressure measurement thermo-sensitive resistor (resistance R1) 3 and the reference output thermo-sensitive resistor (resistance R2) 8 from an external power supply (Vc) 30 and they are connected to constant-current sources 23 and 28, applied with constant currents and emit heat, respectively. A pressure signal voltage V1 and a reference output voltage V2 are generated in the connection sections of the constant-current sources 23 and 28, respectively. A differential amplifier 31 which obtains the difference between the pressure signal voltage V1 and the reference output voltage V2 and amplifies, is connected. When the interior of the cylinder 5 receives pressure P from a fluid, the diaphragm 6 is displaced and approaches the thermo-sensitive resistor 3, increasing heat flow to the diaphragm 6. As a result, the temperature of the pressure measurement thermo-sensitive resistor 3 decreases, the resistance R1 decreases and the pressure signal voltage V1 increases. On the other hand, since the reference output thermo-sensitive resistor 8 is formed at a position on the peripheral section of the diaphragm 6 which position has a smaller displacement by the pressure, even when the pressure is applied, a change in the resistance R2 is small. Namely, a change in the reference output voltage V2 is small. The resistance R1 also changes according to an atmospheric temperature. Therefore, when the atmospheric temperature changes, the pressure signal voltage V1 changes greatly. However, the first thermo-sensitive resistor 3 for pressure measurement and the second thermo-sensitive resistor 8 for reference output are designed to have the same structure and the same resistance and the resistances R1 and R2 have the same temperature dependency. Therefore, when the differential amplifier 31 which obtains the difference between the pressure signal voltage V1 and the reference output voltage V2 and amplifies is used, it is possible to remove an offset component which greatly changes according to temperature and to amplify and read a pressure signal component. In addition, the film thickness of the diaphragm 6 which is arranged opposite to the first thermo-sensitive resistor 3 for pressure measurement and the second thermo-sensitive resistor 8 for reference output is equal and thermal characteristic such as thermal resistance and thermal capacitance is equal. Therefore, a change in heat flow to the diaphragm according to time is equal. The resistances R1 and R2 have the same change characteristic according to time, therefore, it is possible to remove an offset component and to amplify and read a pressure signal component even when the atmospheric temperature makes sudden change.

Figure 3:
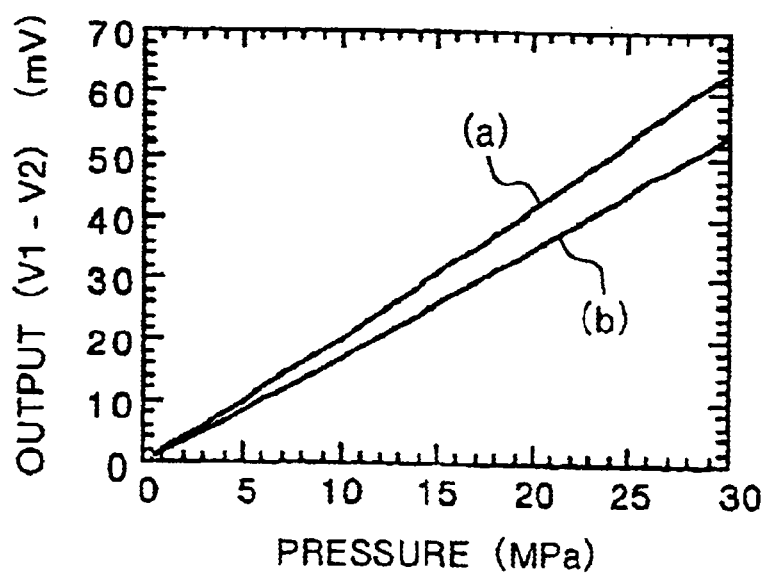
FIG. 3 is a graph which shows the relationship between the position of a thermal detection section and characteristic thereof.

As the position of the second thermo-sensitive resistor 8 for reference output approaches close to the central section of the diaphragm 6, it is possible to make the difference in thermal characteristic with the first thermo-sensitive resistor 3 for pressure measurement smaller, thereby making it possible to remove the offset component more perfectly. However, since the difference in diaphragm displacement quantity between the pressure measurement section and the reference output section becomes smaller, sensitivity is deteriorated. FIG. 3 shows the relationship between the position of the second thermo-sensitive resistor 8 for reference output and sensor output when it is the diaphragm having a diameter of 4 mm. In FIG. 3, (a) denotes such when R2 is arranged outside of the diaphragm (outside of the center thereof by not less than 2.0 mm), and (b) denotes such when the center of R2 is arranged at a position away from the center by 1.5 mm to be opposite thereto. When at least a part of the second thermo-sensitive resistor 8 is opposed to the thin film section of the diaphragm 6, heat is carried not only to the cylinder 5 but also to the diaphragm 6 and it is, therefore, possible to obtain the effect that the thermal characteristic is made closer. Further, even when the thermo-sensitive resistor 8 is formed to be completely opposed to the thin film section of the diaphragm 6 at a position away from the center thereof by 1.5 mm so as to further improve the effect ((b) in FIG. 3), it is possible to obtain 84% sensitivity of when the thermo-sensitive resistor 8 is provided on the cylinder 5 outside of the diaphragm 6 ((a) in FIG. 3). It is seen that sensitivity deterioration caused by making the thermo-sensitive resistor 8 closer to the central section is small.

Second Embodiment

Figure 4:
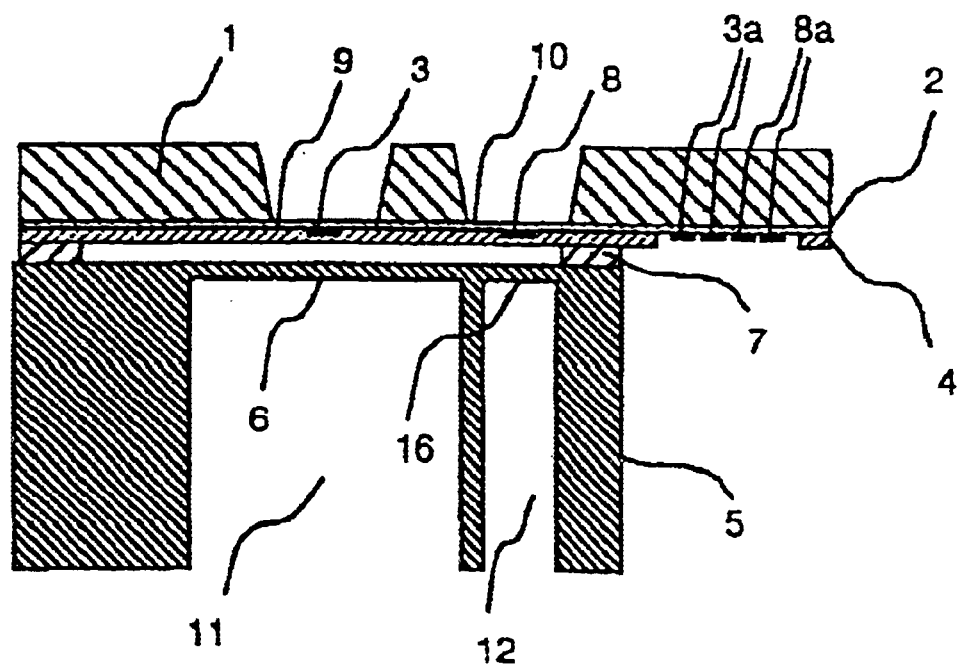
FIG. 4 is a cross-sectional typical view of a pressure sensor according to a second embodiment of the present invention.

The second embodiment of the present invention will be explained hereinafter with reference to the drawings. FIG. 4 is a cross-sectional typical view of a pressure sensor according to a second embodiment of the present invention. In FIG. 4, the structure of the sensor and the principal constituent elements of a read circuit constitution are the same as those explained in the first embodiment with reference to FIGS. 1(a) and 2(b). In FIG. 1(a) of the first embodiment, the second thermo-sensitive resistor for reference output is arranged to be closer to the central direction in which the first thermo-sensitive resistor is located. Therefore, the film thickness of the SUS opposed to the second thermo-sensitive resistor is equal to the film thickness of the central section thereof, to which the first thermo-sensitive resistor for pressure measurement is opposed. In this embodiment shown in FIG. 4, a second chamber 12 and a diaphragm 16 which do not receive pressure are provided inside of an SUS cylinder to which a thermo-sensitive resistor 8 for reference output is opposed. This second SUS diaphragm 16 is processed to have the same film thickness as that of the central section of a first diaphragm 6.

According to the second embodiment, the second SUS diaphragm to which the thermo-sensitive resistor for reference output is opposed, is not displaced by pressure and no sensitivity deterioration occurs. In addition, the film thickness of the SUS to which the second thermo-sensitive resistor for reference output is opposed, is constituted to be equal to that of the central section of the diaphragm to which the thermo-sensitive resistor for pressure measurement is opposed. Therefore, the thermal resistance characteristic of the thermo-sensitive resistor for reference output is almost equal to that of the thermo-sensitive resistor for pressure measurement. Thus, the signal output sensitivity and offset are not drifted even by a sudden change in atmospheric temperature, making it possible to obtain an accurate pressure signal output.

Third Embodiment

Figure 5A:
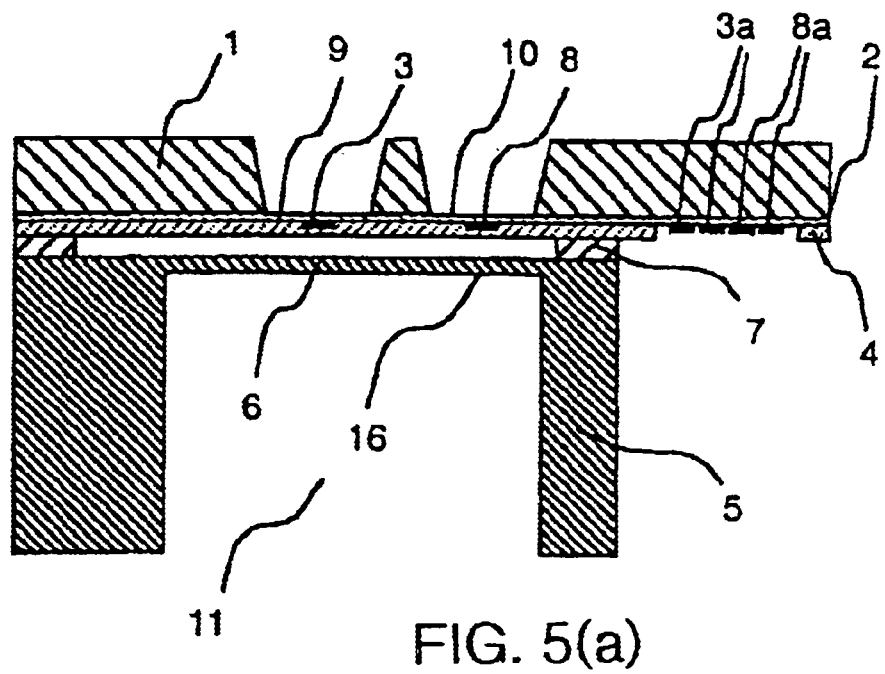
FIGS. 5(a) and 5(b) are cross-sectional and plan views of a pressure sensor according to a third embodiment of the present invention.
Figure 5B:
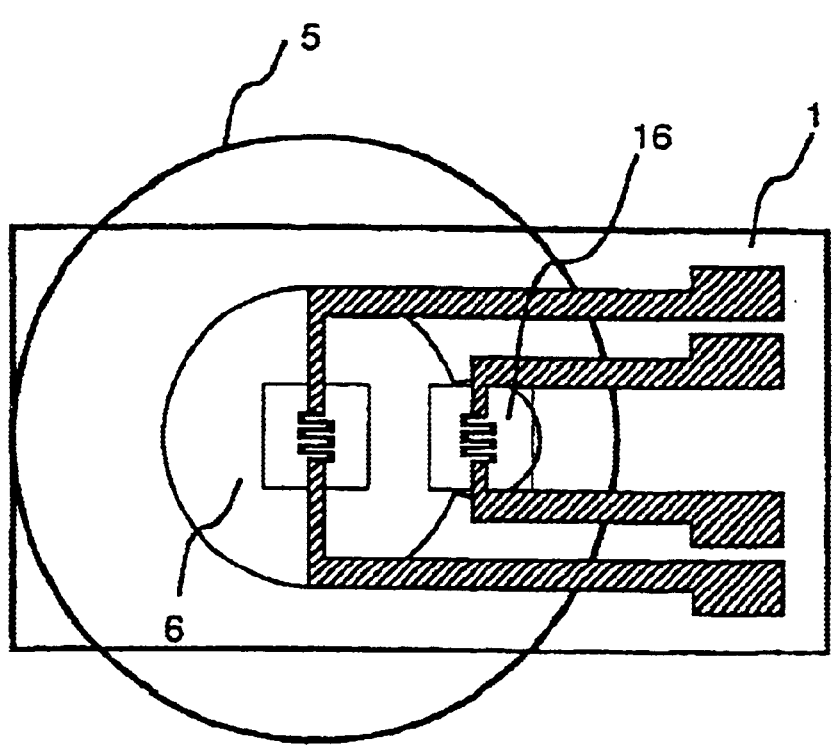
Figure 6:
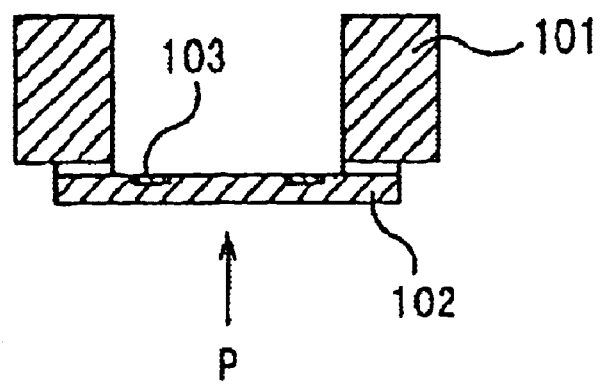
FIG. 6 is a cross-sectional view of a conventional pressure sensor which employs a silicon substrate on a pressure receiving surface and which has a distortion gauge on the silicon substrate.
Figure 7:
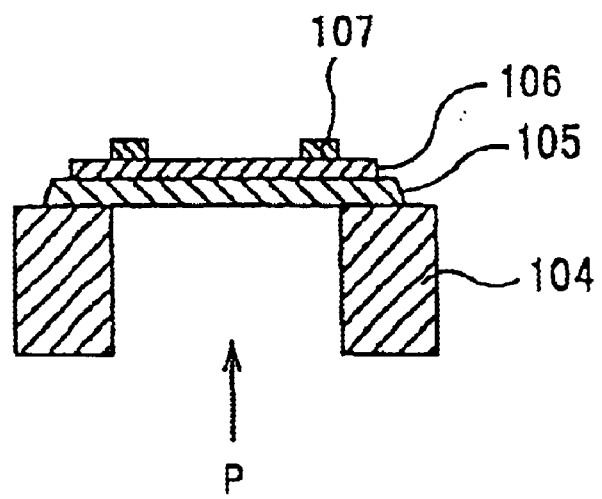
FIG. 7 is a cross-sectional view of a conventional pressure sensor which has a distortion gauge on a pressure receiving surface.
Figure 8A:
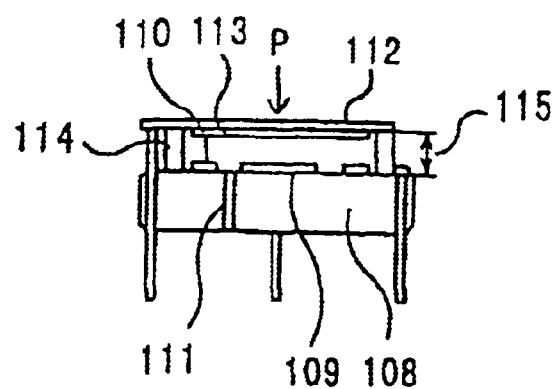
FIGS. 8(a), 8(b), and 8(c) are cross-sectional views of a conventional capacitance type pressure sensor.
Figure 8B:
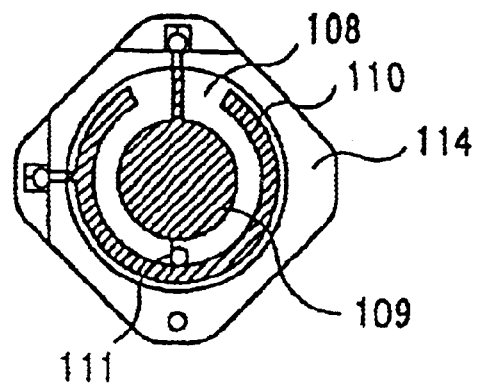
Figure 8C:
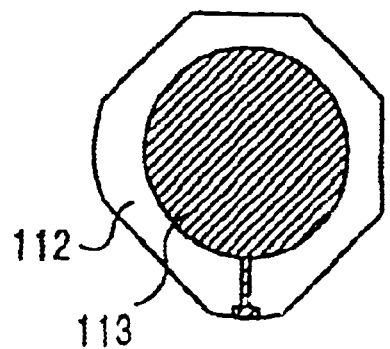

The third embodiment of the present invention will be explained hereinafter with reference to the drawings. FIGS. 5(a) and 5(b) are cross-sectional and plan views of a pressure sensor according to a third embodiment of the present invention. In FIGS. 5(a) and 5(b), the structure of the sensor and the principal constituent elements of a read circuit constitution are the same as those explained in the first embodiment with reference to FIGS. 1(a), 1(b), and 2. In the third embodiment, as shown in FIG. 5, as a second small diaphragm 16 is provided in a section to which a second thermo-sensitive resistor 8 for reference output is opposed. This second SUS diaphragm 16 is formed in the first chamber 11 in which a first diaphragm 6 is formed and it receives the same pressure as that of the first diaphragm 6. However, when the diameter of the diaphragm is set small, it is possible to make the displacement quantity relative to the pressure negligibly small.

According to the third embodiment, the second SUS diaphragm to which the second thermo-sensitive resistor for reference output is opposed, is not displaced by pressure and no sensitivity deterioration occurs. In addition, the film thickness of the second SUS to which the second thermo-sensitive resistor for reference output is opposed, has the same structure (film thickness and material quality) as that of the diaphragm central section to which the first thermo-sensitive resistor for pressure measurement is opposed. It is, therefore, possible to make the thermal resistance characteristic of the second thermo-sensitive resistor for reference output almost equal to that of the first thermo-sensitive resistor for pressure measurement. Thus, the signal output sensitivity and offset are not drifted even by a sudden change in atmospheric temperature, making it possible to obtain an accurate pressure signal output.

INDUSTRIAL APPLICABILITY

The pressure sensor according to this invention is a pressure sensor for, for example, a detection of the oil pressure of a vehicle brake, a detection of fuel pressure for engine control, a detection of oil pressure for transmission, a detection of the coolant pressure of an air conditioner and that of a refrigerator.

What is claimed is:

1. A pressure sensor comprising:
    a diaphragm structure having at least a first diaphragm, the first diaphragm having first and second surfaces, the first surface of the first diaphragm receiving pressure;
    a first thermal detection unit having a heating unit and located opposite a central section of the second surface of the first diaphragm, the first thermal detection unit detecting amount of displacement of the first diaphragm caused by a pressure change based on thermal detection; and
    a second thermal detection unit having a heating unit, wherein at least a part of the second thermal detection unit is located opposite either the first diaphragm or a second diaphragm having the same structure as the first diaphragm.

2. The pressure sensor as claimed in claim 1, wherein the second diaphragm does not receive the pressure and at least a part of the second thermal detection unit is opposed to the second diaphragm, and the first diaphragm and the second diaphragm have equal thicknesses.

3. The pressure sensor as claimed in claim 1, wherein at least a part of the second thermal detection unit is opposed to the second diaphragm, the first diaphragm and the second diaphragm have equal thicknesses, and the second diaphragm has a smaller area than the first diaphragm.

* * * * *